United States Patent [19]

Natho et al.

[11] 3,734,455
[45] May 22, 1973

[54] SAFETY DEVICE FOR A FLUID CYLINDER VALVE ACTUATOR

[75] Inventors: Paul J. Natho, Houston; Felix J. Vicari, Longview, both of Tex.

[73] Assignee: ACF Industries, Incorporated, New York, N.Y.

[22] Filed: Sept. 21, 1971

[21] Appl. No.: 182,345

[52] U.S. Cl. .................251/62, 251/14, 92/128, 92/152, 91/391
[51] Int. Cl. ...................F15b 13/10, F16k 31/143
[58] Field of Search ..................137/269; 251/14, 251/63.5, 62; 91/411 A, 391; 92/128, 152

[56] References Cited

UNITED STATES PATENTS

| | | | |
|---|---|---|---|
| 3,329,392 | 7/1967 | Frantz | 251/30 |
| 2,566,772 | 9/1951 | Otis | 251/26 X |
| 3,570,804 | 3/1971 | Nelson et al. | 251/14 X |

*Primary Examiner*—Arnold Rosenthal
*Attorney*—Eugene N. Riddle

[57] ABSTRACT

A remotely controlled fluid pressure actuator has a valve stem extending through the actuator cylinder and a threaded projection on the top of the cylinder. The cylinder has venting ports adapted to be closed by an O-ring when the latter is pressed down by a sleeve on the threaded projection. An auxiliary override for local operation of the valve is adapted to be connected to the threaded projection in place of the sleeve. The auxiliary override cannot be screwed down far enough to hold the O-ring closed, so that the cylinder is vented to prevent remote operation of the valve while the auxiliary override is attached and necessitating removal of the auxiliary override before the actuator can again be placed in normal service.

3 Claims, 3 Drawing Figures

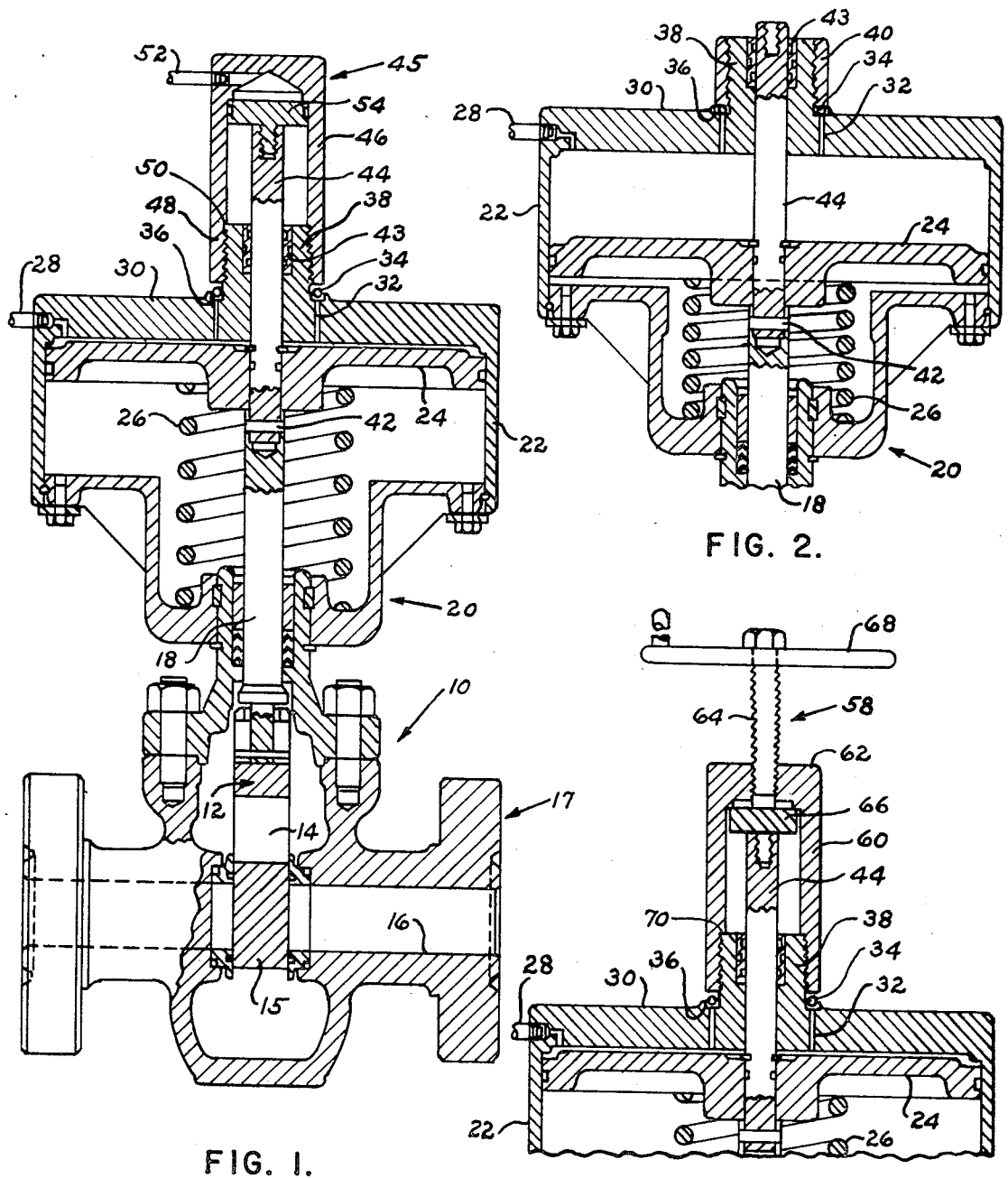

SAFETY DEVICE FOR A FLUID CYLINDER VALVE ACTUATOR

BACKGROUND OF THE INVENTION

It is known to provide gate valves having a fluid pressure actuator with a mechanical or fluid override. The main actuator is adapted to be operated remotely. When it is desired to service or repair the gate valve, it may be actuated locally by the override mechanism. At times the override might not be returned to its full inoperable position upon return of the operation of the valve to the main actuator. In this instance, the valve might not fully close. Accordingly, it is an object of this invention to lock out the remote control of the valve automatically until the override has been phycially removed from the top of the cylinder.

SUMMARY OF THE INVENTION

A gate valve, such as the type used in oil or gas pipelines, is provided with a pneumatic actuator having a pressure cylinder. A number of vent ports are arranged in a circle on the top of the cylinder and are adapted to be closed by an O-ring. The cylinder has an externally threaded projection and an internally threaded sleeve thereon protects the threads and at the same time holds the O-ring pressed against the vent ports to close the ports. The valve stem and the actuator shaft coupled thereto extend through the cylinder and out of the threaded projection. An auxiliary actuator or override is adapted to be screwed on the threaded projection in place of the sleeve. Stop means are provided so that the auxiliary actuator when mounted is prevented from reaching the O-ring, leaving it free to vent the cylinder. Thus, the pneumatic actuator is disabled or locked out of operation as long the auxiliary actuator is attached to the top of the cylinder. Upon removal of the override and replacement with the internally threaded sleeve, the main actuator may be reactivated for operation of the gate valve.

BRIEF DESCRIPTION OF THE DRAWING

The invention is illustrated in the following figures of the drawing;

FIG. 1 is a section of a gate valve in closed position equipped with a hydraulic override.

FIG. 2 is a section of the actuator portion with the vent closing means attached.

FIG. 3 is a view similar to FIG. 1 showing a mechanical override.

DESCRIPTION OF THE PREFERRED EMBODIMENTS

The invention relates to a gate valve having a remotely controlled pneumatic operator adapted to be provided with either a mechanical or a pressure operated override arranged so that when either of these is used the pneumatic actuator is disabled and prevented from being operated remotely. This is accomplished by providing the pneumatic operator with venting means which remains open to atmosphere when the override is connected. The venting means is closed when the override is removed and replaced by a separate thread protector adapted to engage and close the venting means.

Gate valve structure generally indicated 10 has a gate valve 12 provided with an opening 14. Gate valve 12 is shown in closed position in FIG. 1 with a slab portion 15 of the valve blocking flow through fluid conduit 16 in valve body 17. Upon opening of valve 12, opening 14 is aligned with fluid conduit 16 to permit fluid flow through valve structure 10. Gate valve 12 is connected to stem 18 which extends into pneumatic actuator 20. The latter includes a cylinder 22, a piston 24, and a spring 26, which urges gate 12 upward to its closed position. Pneumatic pressure may be supplied to cylinder 22 through inlet 28 from a remote source. Upper wall 30 of cylinder 22 has a number of ports 32 arranged in a circle. O-ring 34 is adapted to lodge in a groove 36 so as to hold ports 32 closed when O-ring 34 is held pressed down, as shown in FIG. 2.

Cylinder 22 has an externally threaded projection 38 adapted to receive thread protector 40, which tightly engages O-ring 34 to hold ports 32 closed. Thread protector 40 is an internally threaded sleeve or nut which engages the external threads on projection 38 as shown in FIG. 2. Stem 18 is coupled at 42 to shaft 44 which extends through bore 43 in projection 38. An override generally indicated 45, preferably of the hydraulic type, for locally actuating gate valve 12 includes a cylinder or housing 46 having a coupling 48 adapted to be threaded onto projection 38. Cylinder 46 has a shoulder 50 engaging the upper end of projection 38 for limiting the downward travel of cylinder 46 when threaded onto projection 38 thereby to prevent it from engaging O-ring 34. Cylinder 46 has a fluid inlet 52 and a piston 54 threaded into shaft 44. If pressure is supplied through inlet 28 to the top of cylinder 22, O-ring 34 will lift up and permit ports 32 to vent the cylinder and consequently prevent actuation of gate valve 12. On the other hand, if pressure is applied to inlet 52 of override 45, piston 54 will be moved downwardly and cause gate 12 to move to the open position of the valve. When pressure is not applied to either the pneumatic actuator or the override, spring 26 moves piston 24 to the position shown in FIG. 1; and since the piston is fixed to shaft 44, the gate is moved upward to its closed position.

Referring now to FIG. 3, gate valve structure 10 and pneumatic actuator 20 are identical with those shown in FIG. 1. The valve, however, is provided with a mechanical override generally indicated 58, instead of a fluid pressure operated override 45 of FIG. 1. The mechanical override includes a housing 60 threaded on projection 38. Housing 60 has an internally threaded end cap 62, through which a screw 64 extends. The lower end of screw 64 has a disc 66 engaging the upper end of shaft 44. Handwheel 68 is fixed to an upper portion of screw 64. It is evident, then, that when screw 64 is turned downward thround end cap 62 by handwheel 68, shaft 44, stem 18 and gate 12 will be moved downward against spring 26 to open gate valve 12. A soulder 70 on housing 60 engages the upper end of projection 38 to limit the downward movement of housing 60 when threaded on projection 38 thereby to space the lower end of housing 60 from O-ring 34. Since housing 60 does not engage O-ring 34, pneumatic operator 20 is disabled, as explained above with reference to FIG. 1. When mechanical override 45 is not being used, thread protector 40 shown in FIG. 2 is substituted to hold vent ports 32 sealed and thus place pneumatic operator 20 in operative condition.

From the above, it is understood that three separate attachments may be threaded selectively onto the upper end of projection 38; the fluid pressure override 45 as shown in FIG. 1; the manual override 58 shown in FIG. 3; or the thread protector 40 shown in FIG. 2 Vents 32 provide safety means which prevent remote actuation of actuator 20 unless it is specifically desired. In such instance, sleeve or thread protector 40 may be threaded onto projection 38.

What is claimed is:

1. A valve structure comprising a gate valve; a stem connected to the gate valve; a remotely controlled fluid actuator including a cylinder and a piston in said cylinder connected to said stem for movement of the gate valve; an externally threaded projection on said cylinder in axial alignment with the stem and having a central bore receiving the stem, vent means for the cylinder positioned adjacent said projection and communicating with atmosphere, releasable means for closing said vent means to prevent the venting of the cylinder; a removable override for the fluid actuator for selective positioning on said threaded projection and engagement with said stem for actuating the gate valve, said override when in operative position on said threaded projection permitting venting of the cylinder through said vent means whereby said remotely controlled fluid actuator is inoperative; and a separate attachment removably secured to said threaded projection upon removal of said override engaging said releasable means and closing said vent means thereby to render operative said remotely controlled fluid actuator.

2. A valve structure comprising, a gate valve, a stem connected to the gate valve, a remotely controlled fluid actuator including a cylinder and a piston in said cylinder connected to said stem for movement of the gate valve, a projection on said cylinder in axial alignment with the stem and having a central bore receiving the stem, vent means for the cylinder positioned adjacent said projection and communicating with atmosphere, releasable means for closing said vent means to prevent the venting of the cylinder, and a separate attachment removably secured to said projection engaging said releasable means to close said vent means thereby rendering operative said remotely controlled fluid actuator.

3. A valve structure as set forth in claim 2 wherein said releasable means includes a compressible ring arranged to close the vent means.

* * * * *